United States Patent
He

(10) Patent No.: US 12,356,346 B2
(45) Date of Patent: Jul. 8, 2025

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 358 days.

(21) Appl. No.: 17/535,494

(22) Filed: Nov. 24, 2021

(65) Prior Publication Data
US 2022/0086777 A1 Mar. 17, 2022

Related U.S. Application Data

(63) Continuation of application No. PCT/CN2019/091405, filed on Jun. 14, 2019.

(51) Int. Cl.
*H04W 56/00* (2009.01)
(52) U.S. Cl.
CPC ....... *H04W 56/001* (2013.01); *H04W 56/006* (2013.01)
(58) Field of Classification Search
CPC .......................... H04W 56/001; H04W 56/006
See application file for complete search history.

(56) References Cited

U.S. PATENT DOCUMENTS

| 2018/0323855 A1 | 11/2018 | Noh et al. |
| 2019/0082431 A1 | 3/2019 | Yi et al. |
| 2019/0103928 A1* | 4/2019 | Nagaraja ............... H04B 17/309 |
| 2019/0141693 A1 | 5/2019 | Guo et al. |

(Continued)

FOREIGN PATENT DOCUMENTS

| CA | 3076273 A1 | 3/2019 |
| CN | 108809369 A | 11/2018 |

(Continued)

OTHER PUBLICATIONS

Communication pursuant to Article 94(3) EPC for European Application 19933026.7 mailed May 3, 2023.

(Continued)

*Primary Examiner* — Jianye Wu
(74) *Attorney, Agent, or Firm* — Sheppard, Mullin, Richter & Hampton LLP

(57) ABSTRACT

A wireless communication method, a terminal device, and a network device are disclosed. The method includes: receiving, by a terminal device, Transmission Configuration Indication (TCI) state configuration information transmitted by a network device, the TCI state configuration information including Synchronization Signal Block (SSB) indication information, the SSB indication information being an SSB transmission position index or an SSB Quasi-Co-Located (QCL) index, and the SSB indication information being used to determine a reference SSB satisfying a QCL relationship with a downlink channel; and receiving, by the terminal device, the downlink channel based on the QCL relationship between the reference SSB and the downlink channel.

18 Claims, 3 Drawing Sheets

(56) References Cited

U.S. PATENT DOCUMENTS

2020/0267571 A1     8/2020    Park et al.
2022/0015146 A1*   1/2022    Rune ................. H04W 74/0816

FOREIGN PATENT DOCUMENTS

| CN | 109076364 | A |   | 12/2018 |           |
|----|-----------|---|---|---------|-----------|
| CN | 109076378 | A |   | 12/2018 |           |
| CN | 109076560 | A |   | 12/2018 |           |
| CN | 109076593 | A |   | 12/2018 |           |
| CN | 109150250 | A |   | 1/2019  |           |
| CN | 109586872 | A |   | 4/2019  |           |
| CN | 109803427 | A |   | 5/2019  |           |
| CN | 111866936 | A | * | 10/2020 | H04L 5/001 |
| WO | 2019032020 | A1 |  | 2/2019  |           |
| WO | 2019049107 | A1 |  | 3/2019  |           |
| WO | 2019066618 | A1 |  | 4/2019  |           |

OTHER PUBLICATIONS

Qualcomm Incorporated: "Initial access and mobility procedures for NR unlicensed", 3GPP Draft; R1-19072627.2.2.2.2 Initial Access and Mobilityprocedures for NR-U, 3rd Generation Partnership Project (3GPP), Mobile Competence Centre ; 650, Route Des Lucioles ; F-06921 Sophia-Antipol vol. RAN WG1, no. Reno, US ; May 13, 2019-May 17, 2019 May 13, 2019(May 13, 2019), XP051728702.

The Grant Notice from corresponding Chinese Application No. 202111671301.3, dated Mar. 26, 2023 . English translation attached.

Extended European Search Report dated May 13, 2022 received in European Patent Application No. EP 19933026.7.

International Search Report and Written Opinion date Feb. 27, 2020 in International Application No. PCT/CN2019/091405. English translation attached.

3GPP. 3rd Generation Partnership Project; Technical Specification Group Radio Access Network; NR; "Multiplexing and channel coding"(Release 15), 3GPP TS 38.212 V15.2.0, Jun. 2018, 98 pages.

3GPP. 3rd Generation Partnership Project; Technical Specification Group Radio Access Network; NR; "Physical layer procedures for control"(Release 15), 3GPP TS 38.213 V15.2.0, Jun. 2018, 99 pages.

3GPP. 3rd Generation Partnership Project; Technical Specification Group Radio Access Network; NR; "Physical layer procedures for data"(Release 15), 3GPP TS 38.214 V15.2.0, Jun. 2018, 95 pages.

3GPP. 3rd Generation Partnership Project; Technical Specification Group Radio Access Network; NR; "Radio Resource Control (RRC) protocol specification"(Release 15), 3GPP TS 38.331 V15.2.1, Jun. 2018, 303 pages.

Communication pursuant to Article 94(3) EPC for European application 19933026.7 mailed Jan. 18, 2023.

First Office Action from corresponding Chinese Application No. 202111671301.3, dated Jan. 3, 2023 . English translation attached.

* cited by examiner

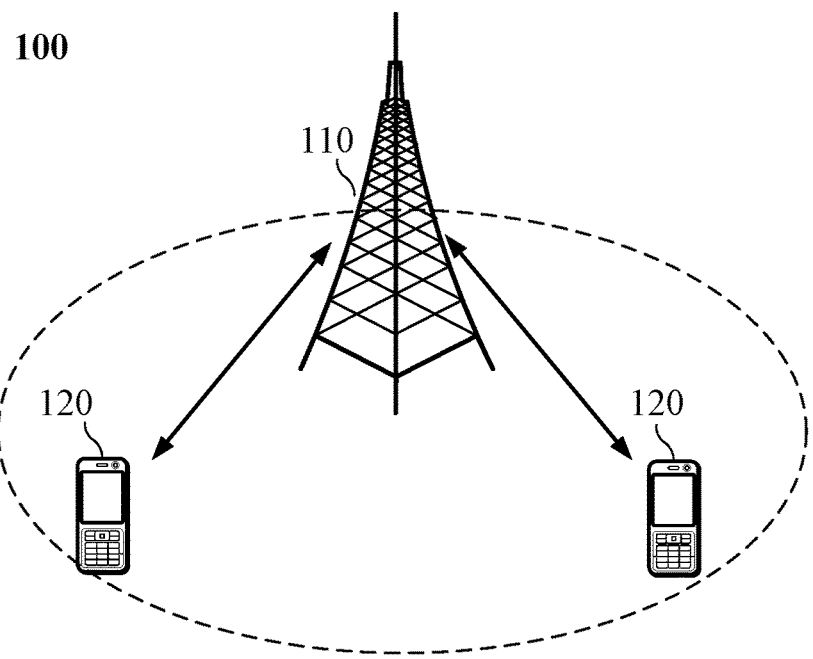

Receiving, by a terminal device, TCI state configuration information transmitted by a network device, wherein the TCI state configuration information includes SSB indication information, the SSB indication information is an SSB transmission position index or an SSB QCL index, and the SSB indication information is used to determine a reference SSB satisfying a QCL relationship with a downlink channel  — S210

Receiving, by the terminal device, the downlink channel based on the QCL relationship between the reference SSB and the downlink channel  — S220

Transmitting, by a network device, TCI state configuration information to a terminal device, wherein the TCI state configuration information includes SSB indication information, the SSB indication information is an SSB transmission position index or an SSB QCL index, and the SSB indication information is used by the terminal device to determine a reference SSB satisfying a QCL relationship with a downlink channel  — S310

FIG. 3

WIRELESS COMMUNICATION METHOD, TERMINAL DEVICE AND NETWORK DEVICE

CROSS-REFERENCE TO RELATED APPLICATION

The present application is a continuation of International Application No. PCT/CN2019/091405, filed on Jun. 14, 2019, the entire contents of which are incorporated herein by reference.

TECHNICAL FIELD

An embodiment of the present disclosure relates to the field of communication, and more specifically, to a wireless communication method, a terminal device, and a network device.

BACKGROUND

In a New Radio (NR) system, a network device can configure a terminal device with a Quasi-Co-Located (QCL) reference signal through Transmission Configuration Indication (TCI) state configuration information. The terminal device may determine the QCL reference signal based on an index of a Synchronization Signal Block/Physical Broadcast Channel block (SSB) in the TCI state configuration information. The SSB index is a transmission position of the SSB.

In an unlicensed frequency band, the communication device follows the "Listen Before Talk (LBT)" principle. That is, the communication device needs to perform channel listening before transmitting signals on a channel of the unlicensed frequency band. The communication device can transmit signals only when a result of channel listening indicates that the channel is idle. If the result of channel listening of the communication device on the channel of the unlicensed frequency band indicates that the channel is busy, the communication device cannot transmit signals.

In an NR-based access to unlicensed spectrum (NR-U) system, the network device must obtain a channel use right through a successful LBT before transmitting the SSB. That is, a transmission position of the SSB is uncertain. In this case, how to indicate, by the network device, the QCL reference signal to the terminal device based on the TCI state configuration information is an issue that is worth studying.

SUMMARY

An embodiment of the present disclosure provides a wireless communication method, a terminal device, and a network device. The terminal device can determine a QCL reference signal based on an SSB transmission position index or an SSB QCL index in TCI state configuration information.

In a first aspect, a wireless communication method is provided. The method includes: receiving, by a terminal device, TCI state configuration information transmitted by a network device, the TCI state configuration information including SSB indication information, the SSB indication information being an SSB transmission position index or an SSB QCL index, and the SSB indication information being used to determine a reference SSB satisfying a QCL relationship with a downlink channel; and receiving, by the terminal device, the downlink channel based on the QCL relationship between the reference SSB and the downlink channel.

In a second aspect, a wireless communication method is provided. The method includes transmitting, by a network device, TCI state configuration information to a terminal device. The TCI state configuration information includes SSB indication information. The SSB indication information is an SSB transmission position index or an SSB QCL index. The SSB indication information is used by the terminal device to determine a reference SSB satisfying a QCL relationship with a downlink channel.

In a third aspect, a terminal device is provided. The terminal device is configured to perform the method according to the first aspect or any possible implementation of the first aspect. Specifically, the terminal device includes a unit configured to perform the method according to the first aspect or any possible implementation of the first aspect.

In a fourth aspect, a network device is provided. The network device is configured to perform the method according to the second aspect or any possible implementation of the second aspect. Specifically, the terminal device includes a unit configured to perform the method according to the second aspect or any possible implementation of the second aspect.

In a fifth aspect, a terminal device is provided. The terminal device includes a processor and a memory. The memory is configured to store a computer program. The processor is configured to invoke and run the computer program stored in the memory to perform the method according to the first aspect or any possible implementation of the first aspect.

In a sixth aspect, a network device is provided. The network device includes a processor and a memory. The memory is configured to store a computer program. The processor is configured to invoke and run the computer program stored in the memory to perform the method according to the second aspect or any possible implementation of the second aspect.

In a seventh aspect, a chip is provided. The chip is configured to perform the method according to any aspect of the first aspect to the second aspect or any implementation of the first aspect to the second aspect.

Specifically, the chip includes a processor configured to invoke and run a computer program from a memory, whereby an apparatus provided with the chip is operative to perform the method according to any aspect of the first aspect to the second aspect or any implementation of any aspect of the first aspect to the second aspect.

In an eighth aspect, a computer-readable storage medium is provided. The computer-readable storage medium stores a computer program. The computer program causes a computer to perform the method according to any aspect of the first aspect to the second aspect or any implementation of any aspect of the first aspect to the second aspect.

In a ninth aspect, a computer program product is provided. The computer program product includes computer program instructions. The computer program instructions cause a computer to perform the method according to any aspect of the first aspect to the second aspect or any implementation of any aspect of the first aspect to the second aspect.

In a tenth aspect, a computer program is provided. The computer program, when running on a computer, causes the computer to perform the method according to any aspect of the first aspect to the second aspect or any implementation of any aspect of the first aspect to the second aspect.

According to the above technical solutions, the terminal device can correctly determine the reference SSB satisfying the QCL relationship with the downlink channel based on the SSB transmission position index or the SSB QCL index in the TCI state configuration information.

BRIEF DESCRIPTION OF DRAWINGS

FIG. 1 is a schematic diagram showing an application scenario according to an embodiment of the present disclosure.

FIG. 2 is a schematic diagram illustrating a wireless communication method according to an embodiment of the present disclosure.

FIG. 3 is a schematic diagram illustrating another wireless communication method according to an embodiment of the present disclosure.

DESCRIPTION OF EMBODIMENTS

Figure 4:
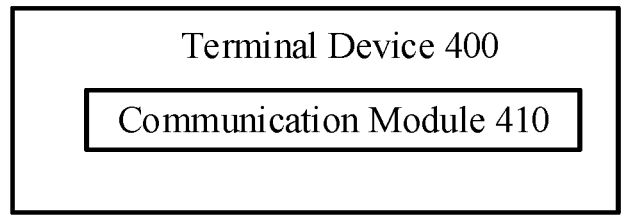
FIG. 4 is a schematic block diagram of a terminal device according to an embodiment of the present disclosure.

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, an Advanced Long Term Evolution (LTE-A) system, an NR system, an evolution system of the NR system, an LTE-based access to unlicensed spectrum (LTE-U) system, an NR-based access to unlicensed spectrum (NR-U) system, a Universal Mobile Telecommunication System (UMTS), a Worldwide Interoperability for Microwave Access (WiMAX) communication system, a Wireless Local Area Network (WLAN), Wireless Fidelity (WiFi), a next-generation of communication system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), and Vehicle to Vehicle (V2V) communication, etc. The embodiments of the present disclosure can also be applied to these communication systems.

Exemplarily, a communication system 100 applied in an embodiment of the present disclosure is as illustrated in FIG. 1. The communication system 100 may include a network device 110. The network device 110 may be a device that communicates with a terminal device 120 (or called a communication terminal or a terminal). The network device 110 may provide communication coverage for a specific geographic region and may communicate with a terminal device located in the coverage region. In at least one embodiment, the network device 110 may be a base station such as Base Transceiver Station (BTS) in a GSM system or a CDMA system, a base station such as NodeB (NB) in a WCDMA system, a base station such as Evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within the coverage region of the network device 110. The "terminal device" used herein includes, but is not limited to, a device configured to receive/transmit a communication signal via a wired line connection, such as a Public Switched Telephone Network (PSTN), a Digital Subscriber Line (DSL), a digital cable, a direct cable connection, and/or via another data connection/network, and/or via a wireless interface, for example, for a cellular network, a Wireless Local Area Network (WLAN), a digital television network such as a Digital Video Broadcasting Handheld (DVB-H) network, a satellite network, and an Amplitude Modulation-Frequency Modulation (AM-FM) broadcast transmitter, and/or via another terminal device; and/or an Internet of Things (IoT) device. A terminal device configured to communicate through the wireless interface may be referred to as a "wireless communication terminal", a "wireless terminal", or a "mobile terminal". Examples of the mobile terminal include but are not limited to, a satellite or a cellular phone, a Personal Communication System (PCS) terminal that may combine a cellular radiotelephone with capabilities such as data processing, facsimile and data communication, a Personal Digital Assistant (PDA) that may include a radiotelephone, a pager, an Internet/intranet access, a Web browser, a notepad, a calendar, and/or a Global Positioning System (GPS) receiver, and a conventional laptop and/or palmtop receiver, or other electronic devices including a radiotelephone transceiver. The terminal device can refer to an access terminal, a User Equipment (UE), a user unit, a user station, a mobile station, a mobile platform, a remote station, a remote terminal, a mobile device, a user terminal, a terminal, a wireless communication device, a user agent, or a user device. The access terminal can be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal device in a 5G network, or a terminal device in the future evolved PLMN, etc.

In at least one embodiment, direct communication, such as Device to Device (D2D) communication, may be performed between the terminal devices 120.

In at least one embodiment, the 5G system or the 5G network may also be referred to as an NR system or an NR network.

FIG. 1 exemplarily illustrates one network device and two terminal devices. In at least one embodiment, the communication system 100 may include a plurality of network devices, and coverage of each network device may include a different number of terminal devices. The embodiments of the present disclosure are not limited to any of these examples.

In at least one embodiment, the communication system 100 may also include other network entities such as a network controller and a mobility management entity, and the embodiment of the present disclosure is not limited to any of these examples.

It should be understood that, in the embodiment of the present disclosure, a device having a communication function in a network/system may be referred to as a communication device. Taking the communication system 100 shown in FIG. 1 as an example, communication devices may include the network device 110 and the terminal devices 120, each having a communication function. The network device 110 and the terminal device 120 may be any of specific devices described above, and details thereof will be omitted here. The communication device may also include another device in the communication system 100, for example other network entities such as a network controller, a mobility management entity, etc., and embodiments of the present disclosure are not limited to any of these examples.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

The method according to the embodiments of the present disclosure can be applied to communication in an unlicensed frequency band, and can also be applied to other communication scenarios, such as a communication scenario in a licensed frequency spectrum.

In the NR system, an SSB can be transmitted within a time window of certain length (for example, 5 ms), and can be transmitted repeatedly at a certain period. This period can be configured by a high-layer parameter, e.g., SSB-timing, as for example, 5 ms, 10 ms, 20 ms, 40 ms, 80 ms, 160 ms, etc. The terminal device can obtain an SSB index of a received SSB based on the received SSB. The SSB index corresponds to a relative position of the SSB within the time window. The SSB index can be used by the terminal device to perform frame synchronization. In addition, the SSB index can also be used to determine a QCL relationship of SSBs. If SSB indices of SSBs received at different time are the same, it can be determined that the SSBs have the QCL relationship.

In the NR system, the network device can use an analog beam to transmit a Physical Downlink Shared Channel (PDSCH). Before performing analog beamforming, the network device needs to determine a beam to be used through a downlink beam management process. The downlink beam management can be performed based on a Channel State Information Reference Signal (CSI-RS) or a Synchronization Signal Block (SSB). Specifically, the network device transmits N SSBs or N CSI-RS resources for beam management, where N is greater than 1. The terminal device performs measurement based on the N SSBs or the N CSI-RS resources, selects K SSBs or K CSI-RS resources that have the best reception quality from the N SSBs or the N CSI-RS resources, where K is greater than or equal to 1, and reports corresponding SSB indices or CSI-RS resource indices and corresponding Reference Signal Receiving Powers (RSRPs) to the network device. The network device determines an optimal SSB or an optimal CSI-RS resource based on the report of the terminal device, determines a transmission beam used by the optimal SSB or the optimal CSI-RS resource as a transmission beam to be used for downlink transmission, and then uses the transmission beam to transmit a downlink control channel or a downlink data channel. Before transmitting the downlink control channel or the downlink data channel, the network device can indicate a QCL reference signal corresponding to the downlink control channel or the downlink data channel to the terminal device through TCI state configuration information, such that the terminal device can use a receiving beam used for receiving the QCL reference signal to receive the corresponding downlink control channel or the corresponding downlink data channel.

Channel resources are shared on the unlicensed frequency band. When using these shared resources, an idle channel needs to be listened before a communication device uses the channel. In this case, it is difficult to guarantee periodic transmissions and receptions of the SSBs at a fixed position. Since a timing position of a successful LBT performed by a transmitting-end device is unpredictable, it is very likely that a transmission and a reception of the SSB will fail due to an LBT failure.

Therefore, in the NR-U system, a plurality of SSB candidate positions are provided, such that after the LBT is successful, there are still enough SSB candidate positions that can be used to transmit the SSB, so as to avoid an impact of the LBT failure on the transmission and reception of the SSB. Specifically, Y SSB candidate positions can be configured within one time window. At most Q SSBs can be transmitted in the Y SSB candidate positions, where Q is smaller than Y. The SSBs can only be transmitted after the transmitting-end device obtains an available channel.

Since the terminal device needs to obtain frame synchronization based on the SSBs received at the candidate positions, SSB transmission position indices (SSB position indices) need to be defined for the candidate positions, where a value range of the SSB position indices is 0~Y−1. SSB QCL indices used to obtain the QCL relationship of the SSBs are also defined, where a value range of the SSB QCL indices is 0~Q−1.

Taking Q=8 and Y=20 as an example, the SSB position indices carried by the SSBs can range from 0 to 19, such that the terminal device can obtain transmission positions of the received SSBs, and further perform frame synchronization. Since a maximum of eight SSBs can be transmitted on twenty candidate positions, the value range of the SSB QCL indices used to obtain the QCL relationship between SSBs is 0 to 7. For SSBs transmitted at different time, if their SSB QCL indices are the same, it is determined that they have the QCL relationship. There is no QCL relationship between SSBs with different SSB QCL indices. For example, if the SSB position indices range from 0-19, SSBs with SSB position indices of 0, 8 and 16 have the QCL relationship. The SSB QCL index may be a result of an operation of the SSB position index modulo Q, i.e., SSB QCL index=Mod (SSB position index, Q).

In the NR-U system, since the SSB can only be transmitted after the network device obtains the channel use right based on a successful LBT, the transmission position of the SSB is uncertain. In this case, it is an urgent problem to be solved regarding how to configure the QCL reference signal by the network device based on the TCI state configuration information for transmission on the downlink channel.

In view of this, an embodiment of the present disclosure provides a technical solution. The network device can configure the QCL reference signal based on SSB indication information in the TCI state configuration information, such that the terminal device can receive the downlink channel based on the QCL reference signal.

FIG. 2 is a schematic flowchart illustrating a wireless communication method according to an embodiment of the present disclosure. A method 200 may be performed by the terminal device in the communication system illustrated in FIG. 1. As illustrated in FIG. 2, the method 200 may at least include a part of the following contents.

At S210, a terminal device receives TCI state configuration information transmitted by a network device. The TCI state configuration information includes SSB indication information. The SSB indication information is an SSB transmission position index or an SSB QCL index. The SSB indication information is used to determine a reference SSB satisfying a QCL relationship with a downlink channel.

At S220, the terminal device receives the downlink channel based on the QCL relationship between the reference SSB and the downlink channel.

Optionally, in an embodiment of the present disclosure, the downlink channel may be a downlink control channel, e.g., a Physical Downlink Control Channel (PDCCH), or a downlink data channel, e.g., a Physical Downlink Shared Channel (PDSCH) and other downlink channels.

Optionally, in an embodiment of the present disclosure, the SSB indication information may also be used to determine the reference SSB of the downlink channel, and this embodiment of the present disclosure is not limited to this.

Optionally, in an embodiment of the present disclosure, a value range of SSB transmission position indices may be determined based on a number of candidate positions for transmitting an SSB within one time window.

Optionally, in some embodiments, the time window may be a transmission window for a Discovery Reference Signal (DRS). For example, a size of the time window may be 5 ms. The DRS may be used for the terminal device to access the network. The DRS may include an SSB.

In at least one embodiment, the number of candidate positions for transmitting the SSB within the one time window may be pre-configured or may be determined based on one or more parameters configured by the network device. In at least one embodiment, the one or more parameters include a size of the time window and a subcarrier spacing of the SSB.

For example, if the size of the time window is 5 ms and the subcarrier spacing of the SSB is 30 kHz, the number of candidate positions can be twenty.

For another example, if the size of the time window is 5 ms and the subcarrier spacing of the SSB is 15 kHz, the number of candidate positions can be ten.

Optionally, in some embodiments, the number of candidate positions for transmitting the SSB within the one time window may correspond to the number Y of candidate positions in the above embodiments.

Optionally, in some embodiments, the SSB transmission position index may correspond to the SSB position index in the above embodiment, and the SSB position index may be used to indicate a transmission position of the SSB within the one time window.

Optionally, in an embodiment of the present disclosure, the SSB QCL index may be used to determine the QCL relationship of the SSBs. SSBs having a same SSB QCL index can be determined to satisfy the QCL relationship. SSBs having different SSB QCL indices can be determined as not satisfying the QCL relationship.

As a determination manner, the SSB QCL index may be a result of an operation of the SSB transmission position index modulo a parameter Q, where Q is a parameter used to determine the QCL relationship of SSBs. In at least one embodiment, the time window may be a transmission window for the DRS, for example, 5 ms.

Optionally, in a specific embodiment, the parameter Q is a maximum number of SSBs having no QCL relationship that are transmitted within one time window, or may be another parameter used to determine the QCL relationship of SSBs.

In at least one embodiment, the parameter Q is pre-configured, or is indicated by the network device. For example, the network device may configure the parameter Q based on high-level signaling.

Determination manners of the reference SSB when the SSB indication information is an SSB transmission position index or an SSB QCL index are described in detail below. For the convenience of distinction and description, the determination manners are marked as Embodiment 1 and Embodiment 2 respectively.

Embodiment 1: the SSB indication information indicates an SSB transmission position index.

In Embodiment 1, the terminal device may determine that an SSB having an SSB transmission position index satisfying a specific condition is a reference SSB (or a QCL reference signal) that satisfies the QCL relationship with a downlink channel to be transmitted.

Optionally, as an embodiment, an SSB transmission position index satisfying a specific condition may be that a result of an operation of an SSB transmission position index (denoted as SSB position index_ck) of the reference SSB modulo the parameter Q is identical to a result of an operation of the SSB transmission position index (SSB position index_s) indicated by the SSB indication information modulo Q. That is, Mod(SSB position index_ck, Q)=Mod(SSB position index_s, Q).

In a specific embodiment, after receiving the SSB indication information, the terminal device may perform an operation of an SSB position index indicated by the SSB indication information modulo Q to obtain a modulo result, and determine a target SSB position index having an identical modulo result to that of the SSB position index indicated by the SSB indication information, and determine an SSB corresponding to the target SSB position index as the reference SSB.

Taking Y=20 and Q=8 as an example, if the SSB position index indicated by the SSB indication information is 12, the terminal device can determine that the SSB having the SSB position index of 4 or 12 is the reference SSB. That is, the terminal device can determine the SSB having the SSB position index of 4 or 12 as a QCL reference signal of the downlink channel and receive the downlink channel based on the QCL reference signal. For example, the terminal device may receive the downlink channel based on a receiving beam that previously received the QCL reference signal.

Optionally, as another embodiment, an SSB transmission position index satisfying a specific condition may be that an SSB transmission position index corresponding to the reference SSB and an SSB transmission position index indicated by the SSB indication information belong to a same subset. SSBs corresponding to the SSB transmission position indices in the subset satisfy the QCL relationship.

Specifically, a plurality of SSB position indices may be divided into a plurality of subsets. SSBs corresponding to SSB position indices in each subset satisfy the QCL relationship, and SSBs corresponding to SSB position indices in different subsets do not satisfy the QCL relationship. After receiving the SSB indication information, the terminal device may determine a subset to which an SSB position index indicated by the SSB indication information belongs, select a target SSB position index in the subset, and determine an SSB corresponding to the target SSB position index as the reference SSB.

Optionally, in the embodiment, results of operations of SSB position indices in a same subset modulo Q are identical to each other, and results of operations of SSB position indices in different subsets modulo Q are different from each other.

A number of the plurality of subsets can be Q. Taking Y=20 and Q=8 as an example, twenty SSB position indices can be divided into eight subsets. For example, SSB position indices 0, 8, and 16 belong to subset 0, and SSB position indices 4 and 12 belong to subset 4, etc.

For example, if the SSB position index indicated by the SSB indication information is 12, the terminal device may determine that the target SSB position index is determined in subset 4. For example, the SSB with the SSB position index of 4 or 12 is determined as a QCL reference signal of a downlink channel. Further, the downlink channel may be received based on the QCL reference signal. For example, the terminal device may receive the downlink channel based on a receiving beam that previously received the QCL reference signal.

Embodiment 2, the SSB indication information indicates an SSB QCL index.

In Embodiment 2, the terminal device may determine that an SSB having an SSB QCL index satisfying a specific condition is the reference SSB (or the QCL reference signal) that satisfies the QCL relationship with a downlink channel to be transmitted.

Optionally, as an embodiment, an SSB QCL index satisfying a specific condition may be that an SSB QCL index of the reference SSB is identical to an SSB QCL index indicated by the SSB indication information.

Optionally, in some embodiments, after receiving the SSB indication information, the terminal device may determine an SSB having the same SSB QCL index as that indicated by the SSB indication information as the reference SSB.

Taking Y=20 and Q=8 as an example, if an SSB QCL index indicated by the SSB indication information is 4, the terminal device can determine the SSB QCL index of 4 as the reference SSB and can receive the downlink channel based on the QCL reference signal. For example, the terminal device may receive the downlink channel based on a receiving beam that previously received the QCL reference signal.

Optionally, in other embodiments, the terminal device may obtain the SSB QCL index after receiving the SSB indication information and may determine at least one SSB position index based on the SSB QCL index. A result of an operation of the at least one SSB position index modulo Q is the SSB QCL index. Further, the terminal device may determine a target SSB position index in the at least one SSB position index.

Taking Y=20 and Q=8 as an example, if the SSB QCL index indicated by the SSB indication information is 4, the terminal device can determine that the SSB position index of the reference SSB is 4 or 12. The terminal device can determine the SSB having the SSB position index of 4 or 12 as the QCL reference signal of a downlink channel and receive the downlink channel based on the QCL reference signal. For example, the terminal device can receive the downlink channel based on a receiving beam that previously received the QCL reference signal.

Optionally, in an embodiment of the present disclosure, one piece of TCI state configuration information may include the following configurations:
1. TCI state Identify (ID), used to identify a TCI state;
2. QCL information 1;
3. QCL information 2.

In at least one embodiment, one QCL information may include QCL type configuration and QCL reference signal configuration.

The QCL type configuration, for example, may be one of QCL TypeA, QCL TypeB, QCL TypeC, and QCL TypeD.

The QCL reference signal configuration, for example, may include an ID of a cell where the reference signal is located, an ID of a Bandwidth (BWP), and an identifier of the reference signal. For example, the QCL reference signal configuration may be a CSI-RS resource ID or an SSB index.

In at least one embodiment, a QCL type of at least one of the QCL information 1 and the QCL information 2 is one of the QCL TypeA, the QCL TypeB, and the QCL TypeC. If another one of the QCL information 1 and the QCL information 2 is configured, the QCL type of the another one is QCL TypeD.

In at least one embodiment, definitions of different QCL type configurations are as follows:
1. QCL-TypeA: {Doppler shift, Doppler spread, average delay, delay spread};
2. QCL-TypeB: {Doppler shift, Doppler spread};
3. QCL-TypeC: {Doppler shift, average delay};
4. QCL-TypeD: {Spatial Rx parameter}.

Optionally, in an embodiment of the present disclosure, if the terminal device determines that the QCL reference signal of the downlink channel is a first SSB based on the SSB indication information in the TCI state configuration information, and the QCL type configuration is QCL-TypeA, QCL-TypeB or QCL-TypeC, the terminal device can assume that the downlink channel and the first SSB have identical target large-scale parameters and thus can be received using a same receiving parameter. The target large-scale parameter can be determined based on the QCL type configuration. Similarly, if the terminal device determines that the QCL reference signal of the downlink channel is the first SSB based on the SSB indication information in the TCI state configuration information, and the QCL type configuration is QCL-TypeD, the terminal device can use a spatial receiving parameter identical to that used for receiving the first SSB, for example, a receiving beam, to receive a target downlink channel.

Therefore, with the wireless communication method according to the embodiments of the present disclosure, the terminal device can correctly determine a reference SSB that satisfies a QCL relationship with a downlink channel based on an SSB transmission position index or an SSB QCL index in TCI state configuration information. Further, the downlink channel can be received using a receiving parameter that receives the reference SSB, such that system performance can be improved.

The wireless communication method according to the embodiment of the present disclosure is described in detail above with reference to FIG. 2 from the perspective of a terminal device, and an wireless communication method according to another embodiment of the present disclosure will be described in detail below with reference to FIG. 3 from the perspective of a network device. It should be understood that description on a network device side and description on a terminal device side correspond to each other. Similar description can be referred to above description. To avoid repetition, details thereof will be omitted here.

FIG. 3 is a schematic flowchart illustrating a wireless communication method 300 according to another embodiment of the present disclosure. The method 300 may be executed by the network device in the communication system illustrated in FIG. 1. As illustrated in FIG. 3, the method 300 includes the following contents.

At S310, a network device transmits TCI state configuration information to a terminal device. The TCI state configuration information includes SSB indication information. The SSB indication information is an SSB transmission position index or an SSB QCL index. The SSB indication information is used by the terminal device to determine a reference SSB satisfying a QCL relationship with a downlink channel.

Optionally, in some embodiments, when the SSB indication information indicates the SSB transmission position index, a result of an operation of an SSB transmission position index corresponding to the reference SSB modulo a parameter Q is identical to a result of an operation of the SSB transmission position index indicated by the SSB indication information modulo Q. The parameter Q is a parameter used to determine the QCL relationship of SSBs.

Optionally, in some embodiments, the SSB transmission position index belongs to a first subset of a plurality of subsets. SSBs corresponding to SSB transmission position indices in each of the plurality of subsets satisfy the QCL relationship. SSBs corresponding to SSB transmission position indices in different subsets do not satisfy the QCL relationship.

Optionally, in some embodiments, the SSB transmission position index corresponding to the reference SSB and the SSB transmission position index indicated by the SSB indication information belong to a same subset.

Optionally, in some embodiments, results of operations of SSB transmission position indices in a same subset modulo the parameter Q are identical to each other. Q is the parameter used to determine the QCL relationship of SSBs.

Optionally, in some embodiments, when the SSB indication information indicates an SSB QCL index, an SSB QCL index corresponding to the reference SSB is identical to the SSB QCL index indicated by the SSB indication information.

Optionally, in some embodiments, SSBs having a same SSB QCL index satisfy the QCL relationship, and SSBs having different SSB QCL indices do not satisfy the QCL relationship.

Optionally, in some embodiments, an SSB QCL index is a result of an operation of an SSB transmission position index modulo a parameter Q. Q is a parameter used to determine the QCL relationship of SSBs.

Optionally, in some embodiments, the downlink channel is a PDCCH or a PDSCH.

Optionally, in some embodiments, a value range of the SSB transmission position indices is determined based on a number of candidate positions for transmitting an SSB within one time window.

Optionally, in some embodiments, the number of candidate positions for transmitting the SSB within the one time window is pre-configured or determined based on one or more parameters configured by the network device.

Optionally, in some embodiments, the one or more parameters include a size of the time window and a subcarrier spacing of the SSB.

Optionally, in some embodiments, the parameter Q is pre-configured, or is indicated by the network device.

Optionally, in some embodiments, the parameter Q is a maximum number of SSBs having no QCL relationship that are transmitted within one time window.

Method embodiments of the present disclosure are described in detail above with reference to FIG. 2 to FIG. 3. Device embodiments of the present disclosure will be described in detail below with reference to FIG. 4 to FIG. 7. It should be understood that the device embodiments and the method embodiments correspond to each other, and thus similar description may refer to the method embodiments.

FIG. 4 is a schematic block diagram of a terminal device 400 according to an embodiment of the present disclosure. As illustrated in FIG. 4, the terminal device 400 includes a communication module 410.

The communication module 410 is configured to: receive TCI state configuration information transmitted by a network device, in which the TCI state configuration information includes SSB indication information, the SSB indication information is an SSB transmission position index or an SSB QCL index, and the SSB indication information is used to determine a reference SSB satisfying a QCL relationship with a downlink channel; and receive the downlink channel based on the QCL relationship between the reference SSB and the downlink channel.

Optionally, in some embodiments, when the SSB indication information indicates the SSB transmission position index, a result of an operation of an SSB transmission position index corresponding to the reference SSB modulo a parameter Q is identical to a result of an operation of the SSB transmission position index indicated by the SSB indication information modulo Q. The parameter Q is a parameter used to determine the QCL relationship of SSBs.

Optionally, in some embodiments, the SSB transmission position index belongs to a first subset of a plurality of subsets. SSBs corresponding to SSB transmission position indices in each of the plurality of subsets satisfy the QCL relationship. SSBs corresponding to SSB transmission position indices in different subsets do not satisfy the QCL relationship.

Optionally, in some embodiments, the SSB transmission position index corresponding to the reference SSB and the SSB transmission position index indicated by the SSB indication information belong to a same subset.

Optionally, in some embodiments, results of operations of SSB transmission position indices in a same subset modulo the parameter Q are identical to each other. Q is a parameter used to determine the QCL relationship of SSBs.

Optionally, in some embodiments, when the SSB indication information indicates an SSB QCL index, an SSB QCL index corresponding to the reference SSB is identical to the SSB QCL index indicated by the SSB indication information.

Optionally, in some embodiments, SSBs having a same SSB QCL index satisfy the QCL relationship, and SSBs having different SSB QCL indices do not satisfy the QCL relationship.

Optionally, in some embodiments, the SSB QCL index is a result of an operation of the SSB transmission position index modulo a parameter Q. Q is a parameter used to determine the QCL relationship of SSBs.

Optionally, in some embodiments, the communication module 410 is further configured to receive the downlink channel by using a receiving beam used to receive the reference SSB.

Optionally, in some embodiments, the downlink channel is a PDCCH or a PDSCH.

Optionally, in some embodiments, a value range of the SSB transmission position indices is determined based on a number of candidate positions for transmitting an SSB within one time window.

Optionally, in some embodiments, the number of candidate positions for transmitting the SSB within the one time window is pre-configured or determined based on one or more parameters configured by the network device.

Optionally, in some embodiments, the one or more parameters include a size of the time window and a subcarrier spacing of the SSB.

Optionally, in some embodiments, the parameter Q is pre-configured, or is indicated by the network device.

Optionally, in some embodiments, the parameter Q is a maximum number of SSBs having no QCL relationship that are transmitted within one time window.

It should be understood that the terminal device 400 according to the embodiments of the present disclosure may correspond to the terminal device according to the method embodiments of the present disclosure. In addition, the above and other operations and/or functions of each unit in the terminal device 400 are respectively intended to implement corresponding processes of the terminal device in the method 200 illustrated in FIG. 2. For brevity, details thereof will be omitted herein.

Figure 5:
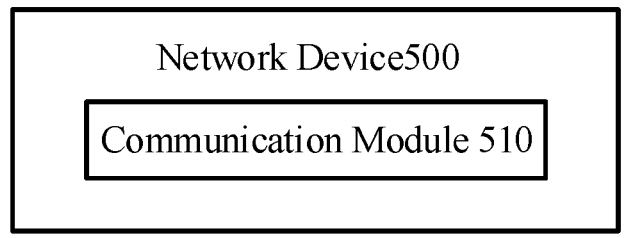
FIG. 5 is a schematic block diagram of a network device according to an embodiment of the present disclosure.

FIG. 5 is a schematic block diagram of a network device according to an embodiment of the present disclosure. A network device 500 illustrated in FIG. 5 includes a communication module 510.

The communication module 510 is configured to transmit TCI state configuration information to a terminal device. The TCI state configuration information includes SSB indication information. The SSB indication information is an SSB transmission position index or an SSB QCL index. The SSB indication information is used by the terminal device to determine a reference SSB satisfying a QCL relationship with a downlink channel.

Optionally, in some embodiments, when the SSB indication information indicates the SSB transmission position index, a result of an operation of an SSB transmission position index corresponding to the reference SSB modulo a parameter Q is identical to a result of an operation of the SSB transmission position index indicated by the SSB indication information modulo Q. The parameter Q is a parameter used to determine the QCL relationship of SSBs.

Optionally, in some embodiments, the SSB transmission position index belongs to a first subset of a plurality of subsets. SSBs corresponding to SSB transmission position indices in each of the plurality of subsets satisfy the QCL relationship. SSBs corresponding to SSB transmission position indices in different subsets do not satisfy the QCL relationship.

Optionally, in some embodiments, the SSB transmission position index corresponding to the reference SSB and the SSB transmission position index indicated by the SSB indication information belong to a same subset.

Optionally, in some embodiments, results of operations of SSB transmission position indices in a same subset modulo the parameter Q are identical to each other. Q is a parameter used to determine the QCL relationship of SSBs.

Optionally, in some embodiments, when the SSB indication information indicates the SSB QCL index, an SSB QCL index corresponding to the reference SSB is identical to the SSB QCL index indicated by the SSB indication information.

Optionally, in some embodiments, SSBs having a same SSB QCL index satisfy the QCL relationship, and SSBs having different SSB QCL indices do not satisfy the QCL relationship.

Optionally, in some embodiments, the SSB QCL index is a result of an operation of the SSB transmission position index modulo a parameter Q. Q is a parameter used to determine the QCL relationship of SSBs.

Optionally, in some embodiments, the downlink channel is a PDCCH or a PDSCH.

Optionally, in some embodiments, a value range of the SSB transmission position indices is determined based on a number of candidate positions for transmitting an SSB within one time window.

Optionally, in some embodiments, the number of candidate positions for transmitting the SSB within the one time window is pre-configured or determined based on one or more parameters configured by the network device.

Optionally, in some embodiments, the one or more parameters include a size of the time window and a subcarrier spacing of the SSB.

Optionally, in some embodiments, the parameter Q is pre-configured, or is indicated by the network device.

Optionally, in some embodiments, the parameter Q is a maximum number of SSBs having no QCL relationship that are transmitted within one time window.

It should be understood that the network device 500 according to the embodiments of the present disclosure may correspond to the terminal device according to the method embodiments of the present disclosure. In addition, the above and other operations and/or functions of each unit in the network device 500 are respectively intended to implement corresponding processes of the network device in the method 300 illustrated in FIG. 3. For brevity, details thereof will be omitted herein.

Figure 6:
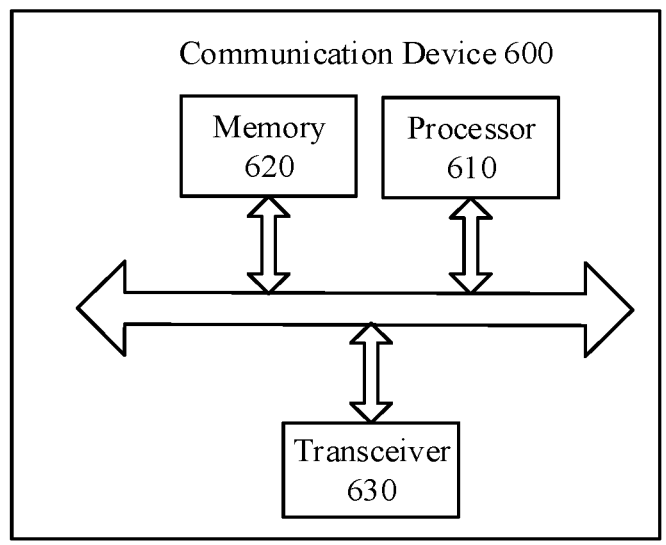
FIG. 6 is a schematic block diagram of a communication device according to an embodiment of the present disclosure.

FIG. 6 is a schematic diagram showing a structure of a communication device 600 according to an embodiment of the present disclosure. The communication device 600 illustrated in FIG. 6 includes a processor 610. The processor 610 is configured to invoke and run a computer program from a memory to perform the method according to any of the embodiments of the present disclosure.

In at least one embodiment, as illustrated in FIG. 6, the communication device 600 may further include a memory 620. The processor 610 may invoke and run a computer program from the memory 620 to perform the method according to any of the embodiments of the present disclosure.

Here, the memory 620 may be a separate component independent of the processor 610 or may be integrated in the processor 610.

In at least one embodiment, as illustrated in FIG. 6, the communication device 600 may further include a transceiver 630. The processor 610 may control the transceiver 630 to communicate with other devices, specifically, to transmit information or data to other devices, or receive information or data transmitted by other devices.

Here, the transceiver 630 may include a transmitter and a receiver. The transceiver 630 may further include one or more antennas.

In at least one embodiment, the communication device 600 may specifically be a network device according to an embodiment of the present disclosure. The communication device 600 may execute corresponding processes implemented by the network device in the method according to any of the embodiments of the present disclosure. For brevity, details thereof will be omitted herein.

In at least one embodiment, the communication device 600 may specifically be the mobile terminal/terminal device according to any of the embodiments of the present disclosure. The communication device 600 may implement corresponding processes implemented by the mobile terminal/terminal device in the method according to any of the embodiments of the present disclosure. For brevity, details thereof will be omitted herein.

Figure 7:
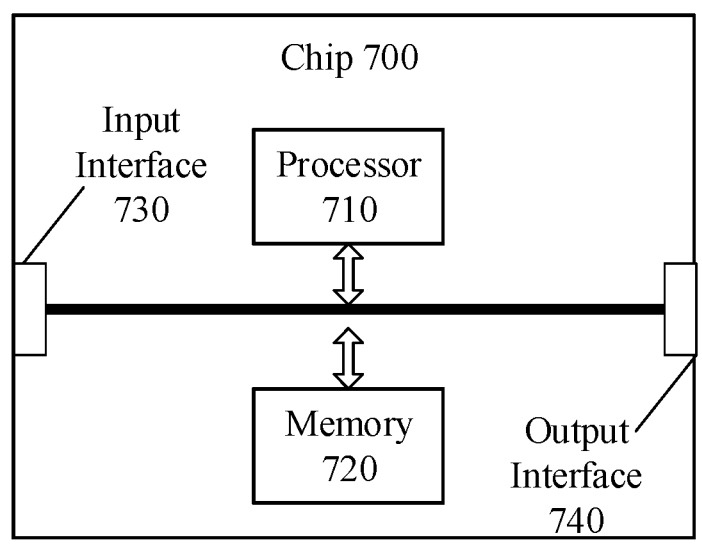
FIG. 7 is a schematic block diagram of a chip according to an embodiment of the present disclosure.

FIG. 7 is a schematic diagram showing a structure of a chip according to an embodiment of the present disclosure. A chip 700 illustrated in FIG. 7 includes a processor 710. The processor 710 can invoke and run a computer program from the memory to perform the method according to any of the embodiments of the present disclosure.

In at least one embodiment, as illustrated in FIG. 7, the chip 700 may further include a memory 720. The processor 710 may invoke and run a computer program from the memory 720 to perform the method according to any of the embodiments of the present disclosure.

Here, the memory 720 may be a separate component independent of the processor 710 or may be integrated in the processor 710.

In at least one embodiment, the chip 700 may further include an input interface 730. The processor 710 can control the input interface 730 to communicate with other devices or chips, Specifically, to obtain information or data transmitted by other devices or chips.

In at least one embodiment, the chip 700 may further include an output interface 740. The processor 710 can control the output interface 740 to communicate with other devices or chips, Specifically to output information or data to other devices or chips.

Optionally, the chip can be applied to the network device according to any of the embodiments of the present disclosure. In addition, the chip can implement corresponding processes implemented by the network device in the method according to any of the embodiments of the present disclosure. For brevity, details thereof will be omitted herein.

Optionally, the chip can be applied to the mobile terminal/terminal device according to any of the embodiments of the present disclosure. The chip can implement corresponding processes implemented by the mobile terminal/terminal device in the method according to any of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip.

An embodiment of the present disclosure further provides a communication system. The communication system includes a terminal device and a network device. Here, the terminal device can be configured to implement the corresponding functions implemented by the terminal device in the above methods. The network device can be configured to implement corresponding functions implemented by the network device in the above methods. For brevity, details thereof will be omitted herein.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a transitory memory or a non-transitory memory or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

In at least one embodiment, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

In at least one embodiment, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

In at least one embodiment, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

In at least one embodiment, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

In at least one embodiment, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

In at least one embodiment, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, a Read-Only Memory (ROM), a Random Access Memory (RAM), a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A wireless communication method, comprising:
   receiving, by a terminal device, Transmission Configuration Indication (TCI) state configuration information transmitted by a network device, wherein the TCI state configuration information comprises Synchronization Signal Block (SSB) indication information, the SSB indication information is an SSB Quasi-Co-Located (QCL) index, and the SSB indication information is used to determine a reference SSB satisfying a QCL relationship with a downlink channel; and
   receiving, by the terminal device, the downlink channel based on the QCL relationship between the reference SSB and the downlink channel,
   wherein the SSB QCL index is an index adapted to indicate that several SSBs have a QCL relationship, wherein SSBs having a same SSB QCL index satisfy the QCL relationship, and SSBs having different SSB QCL indices do not satisfy the QCL relationship;
   wherein the SSB QCL index is a result of an operation of an SSB transmission position index modulo a parameter Q, where Q is a parameter used to determine the QCL relationship of SSBs, and the parameter Q is a maximum number of SSBs having no QCL relationship that are transmitted within one time window.

2. The method according to claim 1, wherein when the SSB indication information indicates the SSB QCL index, an SSB QCL index corresponding to the reference SSB is identical to the SSB QCL index indicated by the SSB indication information.

3. The method according to claim 1, wherein said receiving, by the terminal device, the downlink channel based on the QCL relationship between the reference SSB and the downlink channel comprises:
receiving, by the terminal device, the downlink channel by using a receiving beam used to receive the reference SSB.

4. The method according to claim 1, wherein a value range of the SSB transmission position index is determined based on a number of candidate positions for transmitting an SSB within one time window, and the number of candidate positions for transmitting the SSB within the one time window is pre-configured, or determined based on one or more parameters configured by the network device.

5. The method according to claim 4, wherein the one or more parameters comprise a size of the time window and a subcarrier spacing of the SSB.

6. A wireless communication method, comprising:
transmitting, by a network device, Transmission Configuration Indication (TCI) state configuration information to a terminal device, wherein the TCI state configuration information comprises Synchronization Signal Block (SSB) indication information, the SSB indication information is an SSB Quasi-Co-located (QCL) index, and the SSB indication information is used by the terminal device to determine a reference SSB satisfying a QCL relationship with a downlink channel,
wherein the SSB QCL index is an index adapted to indicate that several SSBs have a QCL relationship, wherein SSBs having a same SSB QCL index satisfy the QCL relationship, and SSBs having different SSB QCL indices do not satisfy the QCL relationship;
wherein SSB QCL index is a result of an operation of an SSB transmission position index modulo a parameter Q, where Q is a parameter used to determine the QCL relationship of SSBs, and the parameter Q is a maximum number of SSBs having no QCL relationship that are transmitted within one time window.

7. The method according to claim 6, wherein when the SSB indication information indicates the SSB QCL index, an SSB QCL index corresponding to the reference SSB is identical to the SSB QCL index indicated by the SSB indication information.

8. The method according to claim 6, wherein a value range of the SSB transmission position index is determined based on a number of candidate positions for transmitting an SSB within one time window, and the number of candidate positions for transmitting the SSB within the one time window is pre-configured, or determined based on one or more parameters configured by the network device.

9. The method according to claim 8, wherein the one or more parameters comprise a size of the time window and a subcarrier spacing of the SSB.

10. A network device, comprising:
a processor; and
a memory,
wherein the memory is configured to store a computer program, and the processor is configured to invoke and run the computer program stored in the memory to perform the method according to claim 6.

11. The network device according to claim 10, wherein when the SSB indication information indicates the SSB QCL index, an SSB QCL index corresponding to the reference SSB is identical to the SSB QCL index indicated by the SSB indication information.

12. The network device according to claim 10, wherein a value range of the SSB transmission position index is determined based on a number of candidate positions for transmitting an SSB within one time window, and the number of candidate positions for transmitting the SSB within the one time window is pre-configured, or determined based on one or more parameters configured by the network device.

13. The network device according to claim 12, wherein the one or more parameters comprise a size of the time window and a subcarrier spacing of the SSB.

14. A terminal device, comprising:
a processor; and
a memory,
wherein the memory is configured to store a computer program, and the processor is configured to invoke and run the computer program stored in the memory to:
receive Transmission Configuration Indication (TCI) state configuration information transmitted by a network device, wherein the TCI state configuration information comprises Synchronization Signal Block (SSB) indication information, the SSB indication information is an SSB Quasi-Co-Located (QCL) index, and the SSB indication information is used to determine a reference SSB satisfying a QCL relationship with a downlink channel; and
receive the downlink channel based on the QCL relationship between the reference SSB and the downlink channel,
wherein the SSB QCL index is an index adapted to indicate that several SSBs have a QCL relationship, wherein SSBs having a same SSB QCL index satisfy the QCL relationship, and SSBs having different SSB QCL indices do not satisfy the QCL relationship;
wherein SSB QCL index is a result of an operation of an SSB transmission position index modulo a parameter Q, where Q is a parameter used to determine the QCL relationship of SSBs, and the parameter Q is a maximum number of SSBs having no QCL relationship that are transmitted within one time window.

15. The terminal device according to claim 14, wherein when the SSB indication information indicates the SSB QCL index, an SSB QCL index corresponding to the reference SSB is identical to the SSB QCL index indicated by the SSB indication information.

16. The terminal device according to claim 14, wherein said receiving, the downlink channel based on the QCL relationship between the reference SSB and the downlink channel comprises:
receiving the downlink channel by using a receiving beam used to receive the reference SSB.

17. The terminal device according to claim 14, wherein a value range of the SSB transmission position index is determined based on a number of candidate positions for transmitting an SSB within one time window, and the number of candidate positions for transmitting the SSB within the one time window is pre-configured, or determined based on one or more parameters configured by the network device.

18. The terminal device according to claim 17, wherein the one or more parameters comprise a size of the time window and a subcarrier spacing of the SSB.

* * * * *